W. H. HENDERSON.
Domestic Boiler.
No 68,564.
Patented Sept. 3, 1867.
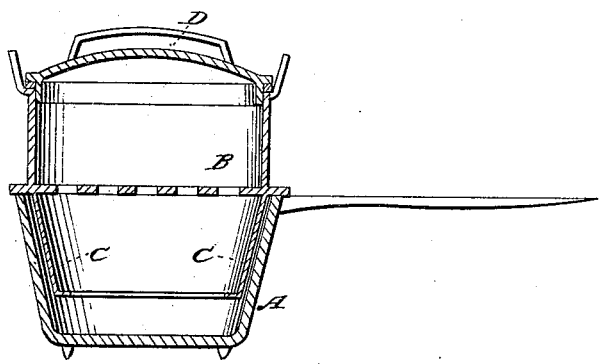
WITNESSES:
INVENTOR:

United States Patent Office.

WILLIAM H. HENDERSON, OF FRANKLIN, INDIANA.

Letters Patent No. 68,564, dated September 3, 1867.

---

IMPROVEMENT IN BOILERS FOR CULINARY PURPOSES.

---

*The Schedule referred to in these Letters Patent and making part of the same.*

---

TO ALL WHOM IT MAY CONCERN:

Be it known that I, W. H. HENDERSON, of Franklin, in the county of Johnson, and in the State of Indiana, have invented certain new and useful Improvements in Vegetable Steamer; and do hereby declare that the following is a full, clear, and exact description thereof, reference being had to the accompanying drawings, and to the letters of reference marked thereon. In the annexed drawings making part of this specification—

A represents a metallic pot of any ordinary construction, to be used either with or without a cooking-stove for steaming purposes. B represents a metallic steamer, provided with a perforated bottom, and with a flange surrounding its outside, which rests upon the top of the pot A for the purpose of supporting it. C represents a conical-shaped rim or flange extending down from and below the perforated bottom of the steamer to near the bottom of the pot. The object of this flange is to extend down into the water of the pot, so that all, or nearly all, of the steam generated in the pot will be passed up through the steamer. In the ordinary steamer, where a flange does not extend down into the water, much of the steam is liable to escape around the rim of the pot and not pass through the steamer.

Having thus fully described my invention, what I claim as new, and desire to secure by Letters Patent, is—

The steamer B, provided with a flange, C, extending down into the pot or vessel A, as and for the purpose specified.

In testimony that I claim the foregoing I have hereunto set my hand this   day of        1867.

WILLIAM H. HENDERSON.

Witnesses:
   WM. S. YOUNG,
   R. M. MILLER.